United States Patent
Choudhury et al.

(10) Patent No.: US 6,885,634 B1
(45) Date of Patent: Apr. 26, 2005

(54) NETWORK PROTOCOL HAVING STAGGERED RECOVERY

(75) Inventors: Gagan Lal Choudhury, Marlboro, NJ (US); Anurag S. Maunder, Fremont, CA (US)

(73) Assignee: AT&T Corp., New York, NY (US)

( * ) Notice: Subject to any disclaimer, the term of this patent is extended or adjusted under 35 U.S.C. 154(b) by 827 days.

(21) Appl. No.: 09/768,898

(22) Filed: Jan. 24, 2001

(51) Int. Cl.⁷ .............................................. H04L 12/26
(52) U.S. Cl. ......................... 370/217; 714/4; 709/229
(58) Field of Search ................................ 359/110, 117, 359/128, 166; 370/216, 217, 221, 226, 229, 230, 241.1, 242, 244, 245, 248, 249, 252, 254, 255, 359, 384, 395.1, 395.4, 380, 419, 466; 379/15.01, 22, 88.22, 221.03, 221.04, 22.01; 709/220, 221, 223, 224, 226, 229, 235; 714/4, 43; 395/181, 182.02, 200

(56) References Cited

U.S. PATENT DOCUMENTS

| | | | |
|---|---|---|---|
| 5,881,246 A | 3/1999 | Crawley et al. | |
| 5,887,127 A * | 3/1999 | Saito et al. | 714/4 |
| 5,917,820 A | 6/1999 | Rekhter | |
| 5,917,823 A | 6/1999 | Benning et al. | |
| 5,995,503 A | 11/1999 | Crawley et al. | |
| 6,049,524 A | 4/2000 | Fukushima et al. | |
| 6,084,892 A | 7/2000 | Benash et al. | |
| 6,496,941 B1 * | 12/2002 | Segal et al. | 714/4 |
| 6,728,205 B1 * | 4/2004 | Finn et al. | 370/217 |

* cited by examiner

Primary Examiner—Wellington Chin
Assistant Examiner—John Shew

(57) ABSTRACT

A network utilizing a link-state protocol includes a plurality of nodes with associated trunks that recover in a staggered manner. A first trunk associated with a first node is selected for recovery. After the first trunk is recovered, further trunks are selected such that N or less trunks recover at the same time until all trunks associated with the first node are selected for recovery. Node recovery is staggered at selected intervals to minimize or eliminate overload conditions. Staggered recovery in accordance with the present invention can reduce the likelihood of trunk loss due to excessive HELLO messages in an OSPF system and retransmission and retransmission lockout.

14 Claims, 5 Drawing Sheets

100

100

100

100

100

100

100

100

NETWORK PROTOCOL HAVING STAGGERED RECOVERY

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to communication systems and, more particularly, to communication networks utilizing link-state protocols.

BACKGROUND OF THE INVENTION

Communication networks utilize a wide variety of protocols to facilitate data transfers between nodes within the network. As is well known to one of ordinary skill in the art, a network can include a relatively large number of nodes. In such large networks, bringing up the network to an operational state can be a significant undertaking. In addition, changes to the network structure and error recovery can generate message traffic that can overwhelm the network.

One class of protocols that generate significant message traffic when recovering from failures, software upgrades, and the like includes link-state routing protocols such as OSPF (Open Shortest Path First), which is used typically in IP (Internet Protocol) networks, and PNNI (Private Network-Network Interface), which is used typically in Asynchronous Transfer Mode (ATM) networks.

IP and ATM networks are generally organized into one or more areas, each of which includes a link-state database. Link-state routing protocols rely on the exchange of a relatively large number of control messages within each area as the network comes "up," i.e., becomes operational. For example, the network nodes send and receive Link State Advertisement (LSA) messages in the OSPF protocol and PNNI Topology State Update (PTSE) messages in the PNNI protocol for enabling each node to determine the network topology. As the (OSPF) network comes up, OSPF LSA messages are flooded throughout a network area. A given node may receive more than one copy of the same LSA message in which case the first one is regarded as original and the rest are regarded as duplicates. An original LSA message is acknowledged in an LSA acknowledgement message over the trunk from which it came and its copies are flooded over the other trunks. Duplicate messages are typically discarded after processing.

Another type of OSPF control message is the HELLO message that is periodically exchanged over each trunk connecting neighboring nodes. The HELLO messages are used to determine the status of the trunks, i.e., whether a given trunk is up. There are also some timers which, if expired, result in the generation of control messages. Examples of timers include LSA retransmission timers, HELLO refresh timers and LSA refresh timers.

As the network recovers, a node and its neighboring nodes, which are interconnected by trunks, exchange HELLO messages. The exchange of HELLO messages continues periodically as long as the trunk is up. Next, the nodes perform LSA database synchronization by exchanging all the LSA headers in their respective databases. Each node then identifies any new or more recent LSA messages in the neighboring node's database and requests copies of the identified LSA messages. Each neighbor sends only those LSA messages that have been requested by the other node. In the next step, each node floods a number of new LSA messages throughout the area (or areas) to which they belong. These new LSA messages are either the ones obtained from the neighbor or generated due to a change in topology (e.g., addition of a trunk and/or a node). The flooding of an LSA message by a node results in one original message and usually several duplicate messages at other nodes. An original is acknowledged and flooded over all trunks except the trunk on which the original message was received while duplicates are simply discarded after processing.

During the database synchronization and flooding procedures, the nodes in the network need to process a relatively large number of messages over a short period of time causing a temporary overload at the node processors. Particularly heavily loaded are the nodes that are recovering and/or nodes with a high degree of connectivity. Node processors can typically perform the required message processing over the long term. However, over the short term the overload can cause messages to queue up and even be lost once the allowed queue size is exceeded. While certain types of messages can withstand queuing and loss, the loss of other types of messages can have a negative impact on the network, including network failure.

For example, trunks can be lost due to excessively delayed or lost HELLO messages. HELLO messages are exchanged periodically between neighboring nodes over each trunk connection. These messages indicate the status of the associated trunk. If the HELLO message is not received for a predetermined number of consecutive times (typically three to four times over a period of 15 to 40 seconds) due to excessive queuing delay, or loss due to buffer overflow, then the trunk is declared down even though it is up. If the HELLO messages are eventually processed, then the trunk is declared up, causing another change in the trunk status. Each time the trunk status changes, LSAs are flooded throughout the area. In general, if all the trunks of a node are declared down due to missed HELLO messages, then the entire node is declared down.

A further difficulty that can result in known recovery schemes is so-called re-transmission and "re-transmission lockout" due to excessively delayed or lost LSA acknowledgment messages. If the acknowledgment to an LSA is not received within a certain time period (typically 5 seconds) then the original LSA is retransmitted. The retransmissions cause extra messages in the network and they are typically served at a higher priority than the original transmission. This can cause a slow-down in processing and an increase in queuing for HELLO, LSA and acknowledgment messages. In extreme cases, if enough acknowledgments are outstanding, then the node processor can enter a loop in which only retransmissions are processed, causing a retransmission lockout.

In addition to the OSPF messages described above, there may be other critical messages that monitor various functions of the operating system. If such messages are not processed for an extended period of time, a watchdog timer can reset the node after which the node must recover.

It would, therefore, be desirable to provide a network protocol that overcomes the aforesaid and other disadvantages.

SUMMARY OF THE INVENTION

The present invention provides a network that staggers the recovery of nodes and/or trunks to reduce overload conditions. By staggering the node/trunk recovery, extended overload periods that can take down a network are eliminated or minimized. While the invention is primarily described in conjunction with the Open Shortest Path First (OSPF) Protocol, it is understood that the invention is equally applicable to other link-state protocols, such as PNNI.

In one aspect of the invention, a network includes a plurality of nodes interconnected by respective trunks. A down node staggers trunk recovery such that the trunks recover in sequence until the node becomes operational. In one embodiment, the first trunk for recovery is selected by determining which trunk forms the largest subnetwork. After the first trunk recovers, a first group of trunks is selected for recovery. The trunks can be selected to form the largest subnetwork. After each group of trunks is recovered, further groups of trunks are selected for recovery until the node is up, i.e., all trunks are operational.

In a further aspect of the invention, a plurality of down nodes are recovered in a staggered manner. First and second ones of the down nodes are selected for recovery so as to form the largest subnetwork, for example. A further one of the down nodes that neighbors one of the first and second nodes is then chosen and the interconnecting trunks allowed to recover. Additional down nodes are selected as each down node recovers until the nodes become operational.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
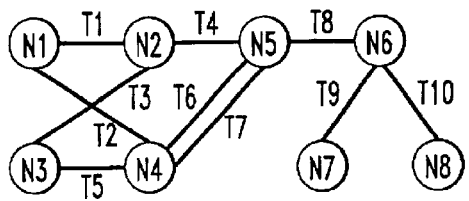
FIG. 1 is a block diagram of an exemplary network having staggered recovery in accordance with the present invention.

FIG. 1 shows an exemplary network 100 providing staggered trunk/node recovery in accordance with the present invention. The network 100 includes eight nodes N1–N8 interconnected by respective trunks T1–T10. The first trunk T1 interconnects the first and second nodes N1, N2 and the second trunk T2 interconnects the first and fourth nodes N1, N4. The second node N2 is connected to the third node N3 via the third trunk T3 and to the fifth node N5 via the fourth trunk T4. The fifth trunk T5 interconnects the third and fourth nodes N3, N4 and the sixth and seventh trunks T6, T7 interconnect the fourth and fifth nodes N4, N5. A sixth node N6 is connected to the fifth node N5 via the eighth trunk T8, to the seventh node N7 via the ninth trunk T9, and to the eighth node N8 via the tenth trunk T10. The nodes N can comprise, for example, IP routers and ATM switches.

In general, the recovery of trunks and/or nodes is staggered so as to reduce the duration of overload conditions following a failure or software upgrade. Staggering of the trunks/nodes reduces the number of messages generated as compared with conventional networks and spreads out the generation of messages. By spreading out the messages over time, several relatively small overload periods occur instead of a single long overload period as in conventional networks. With sufficient gaps between the small overload periods, a node processor can carry out essential tasks during recovery.

The mechanisms used to select the sequence of trunks and/or nodes for recovery can vary. Exemplary mechanisms include forming the largest subnetwork at each stage of network recovery and forming a subnetwork that can carry a maximum number or a desired set of PVCs/SVCs, where PVC stands for a "Permanent Virtual Circuit" and SVC stands for a "Switched Virtual Circuit". It is understood that the node recovery sequence can be static, i.e., predetermined, or dynamic, i.e., each step in the sequence depends on the results of previous steps. In an exemplary embodiment, trunks and/or nodes are sequentially selected for recovery so as to form the largest subnetwork during each stage of recovery. It is understood that the mechanism for selecting trunks for recovery can be the same or different from the mechanism for selecting nodes for recovery.

The number of trunks and/or nodes, e.g., groups, selected for recovery at any one time can vary depending upon a variety of factors, including network topology, node processing power, and total number of LSAs in the system.

As used herein, a node is considered "down," i.e., non-operational, when each trunk associated with the node is down. A node is considered to be up if at least one trunk is "up," i.e., operational. Although the trunks are shown as bi-directional, it is understood that in other embodiments the trunks can be uni-directional.

Figure 2:
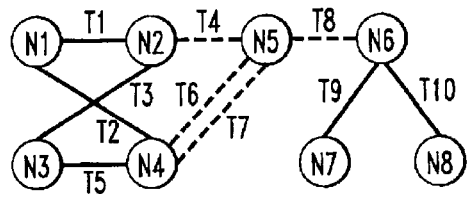
FIG. 2 is a block diagram of the network of FIG. 1 showing one down node.

FIG. 2 shows the fifth node N5 in the network 100 as being down since the trunks T4, T6, T7, T8 associated with the fifth node N5 are down, as indicated by dashed lines. In an exemplary embodiment, the trunks T4, T6, T7, T8 are brought up in a staggered fashion such that the trunks are sequentially selected for recovery to form the largest possible subnetwork. In the present network, selecting any of the fourth, sixth, or seventh trunks T4, T6, T7 forms a subnetwork having five nodes (N1–N5). Selecting the eighth trunk T8 forms a subnetwork having four nodes (N5–N8). Thus, the eighth trunk T8 is eliminated from consideration in selecting the first trunk for recovery.

Figure 3:
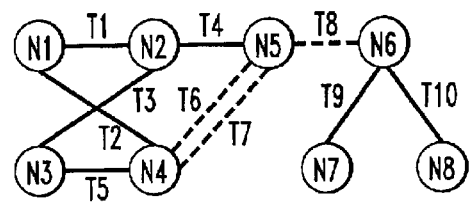
FIG. 3 is a block diagram of the network of FIG. 1 showing a first trunk of the node recovered.

As shown in FIG. 3, the fourth trunk T4 is selected for recovery although the sixth or seventh trunks T6, T7 could have been selected as well. The basis for selecting a particular trunk when a plurality of trunks appear to be equally good choices from the perspective of forming larger subnetworks can vary. In one embodiment, one of the possible choices is randomly selected. Alternatively, a trunk is selected so as to carry certain desired sets of PVCs/SVSs. In a further embodiment, a trunk is selected among a plurality of choices based upon a predetermined order. In the present network, the fourth trunk T4 is selected over the sixth and seventh trunks T6, T7.

The fourth trunk T4 then recovers in a manner well known to one of ordinary skill in the art. In general, recovery includes exchanging HELLO messages, synchronizing LSA databases at the nodes, and flooding LSA messages. Upon successful recovery, the fourth trunk T4 is considered up.

Figure 4:
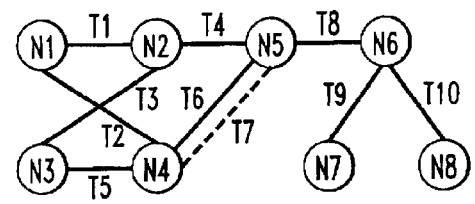
FIG. 4 is a block diagram of the network of FIG. 1 showing a second trunk of the node recovered.

After recovery of the fourth trunk T4, the remainder of the trunks associated with the fifth node N5 can be recovered in groups of trunks, as shown in FIG. 4. It is understood that the number of trunks in the groups can vary in accordance with the particular parameters of a given application and network configuration. It is further understood that the number of trunks in a group can vary for different stages of trunk recovery. In one embodiment, a group of two trunks is selected for recovery after the initial trunk is recovered.

Candidates for the first group are the sixth, seventh and eighth trunks T6, T7, T8. Recovery of the eighth trunk T8 forms a subnetwork of eight nodes and recovery of either of the sixth and seventh trunks T6, T7 form a subnetwork having five nodes. To form the largest subnetwork, the eighth trunk T8 and either of the sixth or seventh trunks T6, T7 can be selected. In one embodiment, shown in FIG. 4, the sixth and eighth trunks T6, T8 are selected for recovery.

The seventh (and final) trunk T7 associated with the fifth node N5 is then selected for recovery. Each trunk associated with the fifth node N5 is now operational as in FIG. 1.

Figure 5:
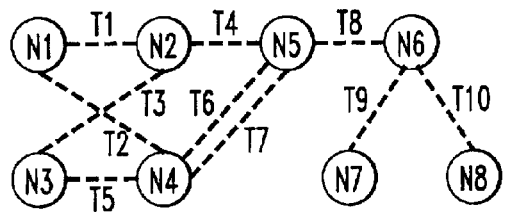
FIG. 5 is a block diagram of the network of FIG. 1 showing a plurality of down nodes.

FIG. 5 shows the network 100 having all nodes N1–N8 down. In accordance with the present invention, the nodes N can be recovered in a staggered fashion. More particularly, a node recovery sequence is determined. Each of the nodes can be recovered by staggering the trunk recovery for the node, as described above. In one embodiment, the nodes are selected for staggered recovery so as to form the largest subnetwork during each stage of node recovery. Since the first node selected forms a subnetwork of one, any of the neighboring nodes can be selected. It is understood that selection of the first node for recovery can be based on a variety of factors, such as the overall network topology, the number of trunks connecting the node, and the number of PVCs/SVSc and customer end-points that will be enabled as a result of recovering the node.

Figure 6:
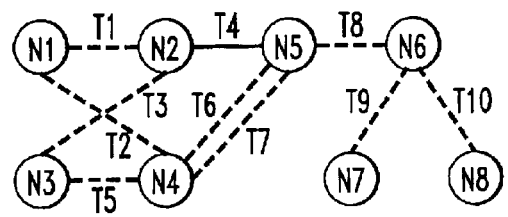
FIG. 6 is a block diagram of the network of FIG. 5 showing first and second nodes selected for recovery.

In one embodiment shown in FIG. 6, the fifth node N5 is first selected for recovery. After selection of the fifth node N5, any of the second, fourth, and sixth nodes N2, N4, N6 can be selected since each selection forms the largest possible subnetwork of two. In one embodiment, shown in FIG. 7, the second node N2 is selected for recovery. The fourth trunk T4, which interconnects the second and fifth nodes N2, N5, then recovers and becomes operational. Any of the first, third, fourth or sixth nodes N1, N3, N4, N6 can be selected next for recovery since each node forms a subnetwork of three nodes.

Figure 7:
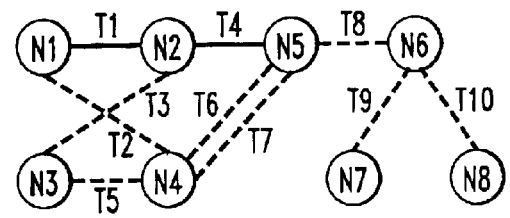
FIG. 7 is a block diagram of the network of FIG. 5 showing a third node selected for recovery.

FIG. 7 shows the first node N1 selected such that the first trunk T1 recovers. Any of the third, fourth, or sixth nodes N3, N4, N6 can be selected next to form the largest subnetwork.

Figure 8:
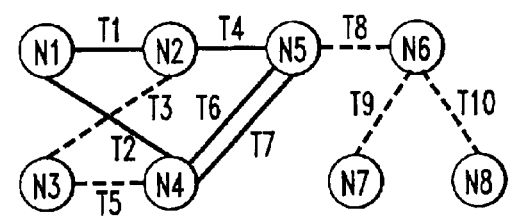
FIG. 8 is a block diagram of the network of FIG. 5 showing a fourth node selected for recovery.
Figure 9:
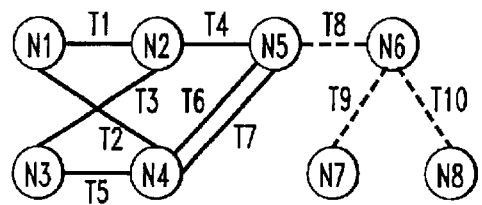
FIG. 9 is a block diagram of the network of FIG. 5 showing a fifth node selected for recovery.

In one embodiment shown in FIG. 8, the fourth node N4 is selected. The second, sixth, and seventh trunks T2, T6, T7 trunks then recover. Either of the third node N3 or the sixth node N6 can next be selected for recovery since each selection forms a subnetwork of five. In one embodiment, the third node N3 is selected as shown in FIG. 9. The third and fifth trunks T3, T5, which are associated with the third node N3, then come up.

Figure 10:
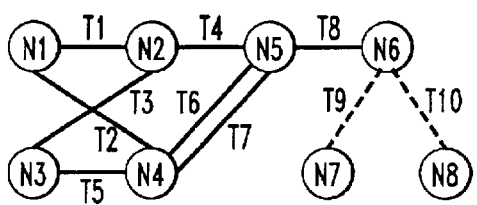
FIG. 10 is a block diagram of the network of FIG. 5 showing a sixth node selected for recovery.
Figure 11:
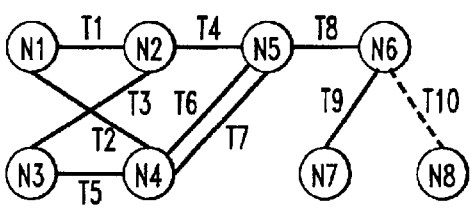
FIG. 11 is a block diagram of the network of FIG. 5, showing a seventh node selected for recovery.
Figure 12:
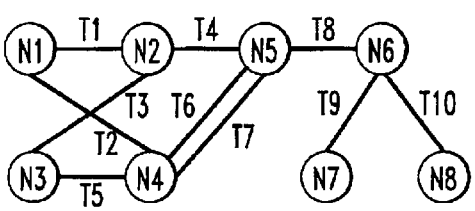
FIG. 12 is a block diagram of the network of FIG. 5 showing an eighth node selected for recovery.

The sixth node N6 can then be selected so that the eighth trunk T8 recovers as shown in FIG. 10. Either of the seventh or eighth nodes N7, N8 can be selected next. In one embodiment, the seventh node N7 is selected as shown in FIG. 11. The ninth trunk T9 then comes up. The eighth node N8 is then selected as shown in FIG. 12. The tenth trunk T10 then recovers such that all the trunks and nodes in the network are up.

Figure 13:
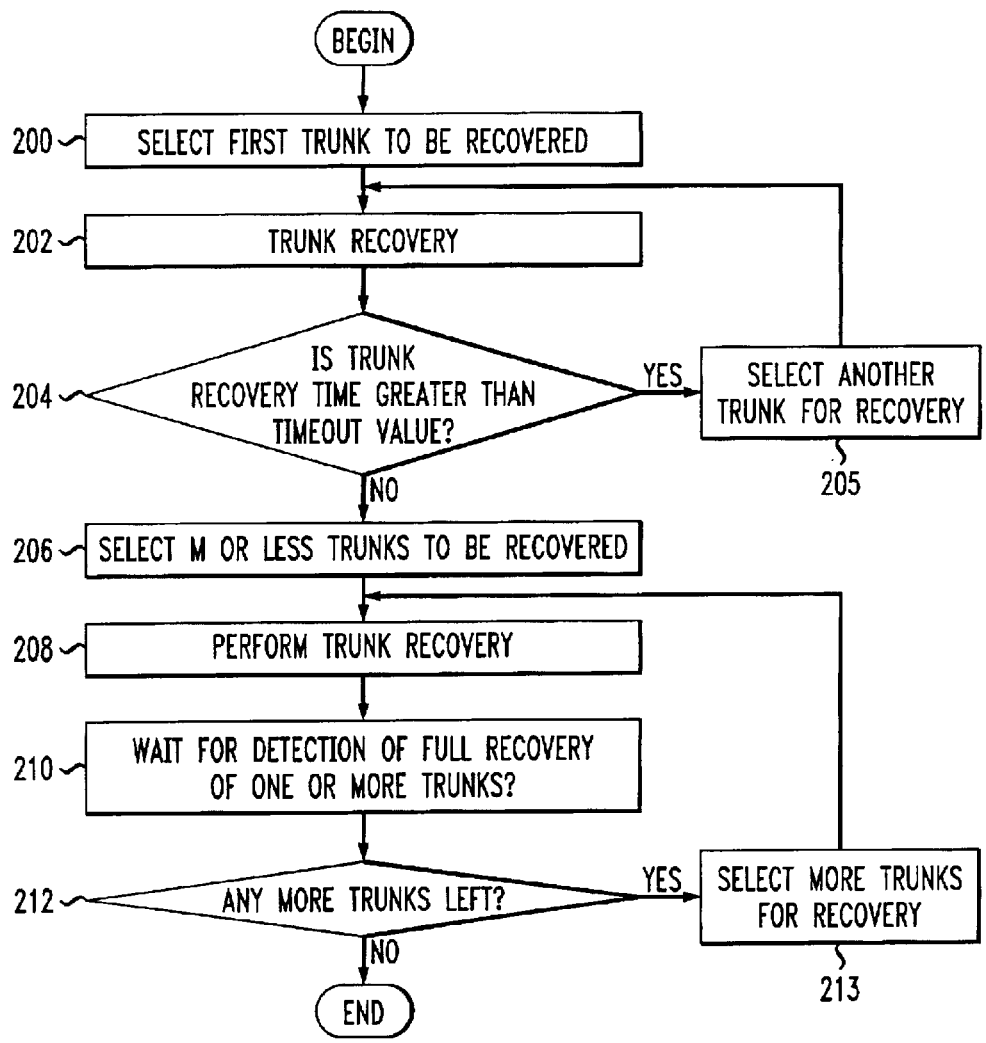
FIG. 13 is a flow diagram showing an exemplary sequence of steps for staggered trunk recovery in accordance with the present invention.

FIG. 13 shows an exemplary sequence of steps for staggered trunk recovery for a down node within a network, such as the network 100 shown in FIG. 1. In step 200, a first trunk of the down node is selected for recovery. In one embodiment, the trunk is selected so as to make the node part of the largest possible subnetwork. In the case where more than one trunk can be selected to form the largest subnetwork, a trunk can be selected based upon a predetermined order derived from the network topology.

In step 202, the recovery process for the selected trunk occurs. More particularly, the trunk recovery procedure includes the exchange of HELLO messages with the neighboring node, database synchronization procedure, and flooding of one or more LSAs in the network. In optional step 204, if the trunk recovery procedure is not completed within a predetermined time period, a time-out occurs and another trunk is selected for recovery in step 205. The new trunk should be selected such that it is connected to a neighboring node different from the node connecting the first trunk. The predetermined time period or time-out interval should be chosen to provide a low probability of time-outs and to reduce overall recovery time. The time-out interval should be based on the network topology and the time required to process messages.

For example, consider a network with 200 nodes and 1000 trunks. Assume that each node has one node-LSA describing its connectivity and one trunk-LSA per trunk describing available trunk bandwidth. So the whole network has 200 node-LSAs and 2000 trunk-LSAs (note that each trunk has two node endpoints, each of which has a trunk-LSA for this trunk). Also assume that there are 800 other LSAs to describe customer endpoints. Thus, in all, there are (200+ 2000+800)=3000 LSAs in the network. As the first trunk of a node recovers, it has to receive and process each of the 3000 LSA-headers and then the actual LSAs. Assuming a 0.25 millisecond processing time per LSA header and a 2 millisecond processing time per LSA, the total processing time is 3000*2.25 ms=6.75 seconds. Assuming that 50% of the node processor is available for LSA processing and the rest is needed for other work, the total time for the first trunk recovery is 6.75 seconds/0.5=13.5 seconds. This is also the processing time surge at the node processor and will be used later. Also note that out of the 13.5 seconds, 12 seconds is spent on LSA processing and 1.5 seconds is spent on LSA header processing. A 100 percent margin, for example, can be added to account for uncertainties in processing time estimates. An exemplary time-out interval for this example is 13.5*2seconds=27 seconds.

Referring again to FIG. 13, if the trunk recovers before the time-out interval is exceeded, further trunks are selected for recovery in step 206. In one embodiment, additional trunks are selected such that a predetermined number M (or less) trunks attempt to recover at any one time. It is understood that the value of M can vary in accordance with the characteristics of the network, the nodes and the trunks. An exemplary range for M is from about two to about four trunks. The initial M trunks are selected so as to make the largest possible subnetwork. If more than one trunk choice exists, one of these trunks can be chosen at random, for example.

In step 208 the trunks recover as described above and in step 210 the recovery of one or more trunks is detected. In step 212, it is determined if any more trunks are left for recovery. If so, in step 213 further trunks are selected for recovery to replace the trunks that have recovered. That is, the recovery process of another trunk is initiated so that the total number of trunks being recovered at any given time equals M or less. Each new trunk can be selected to make the current node part of the largest possible subnetwork If all of the trunks have been recovered, the trunk recovery process for the node is complete.

Figure 14:
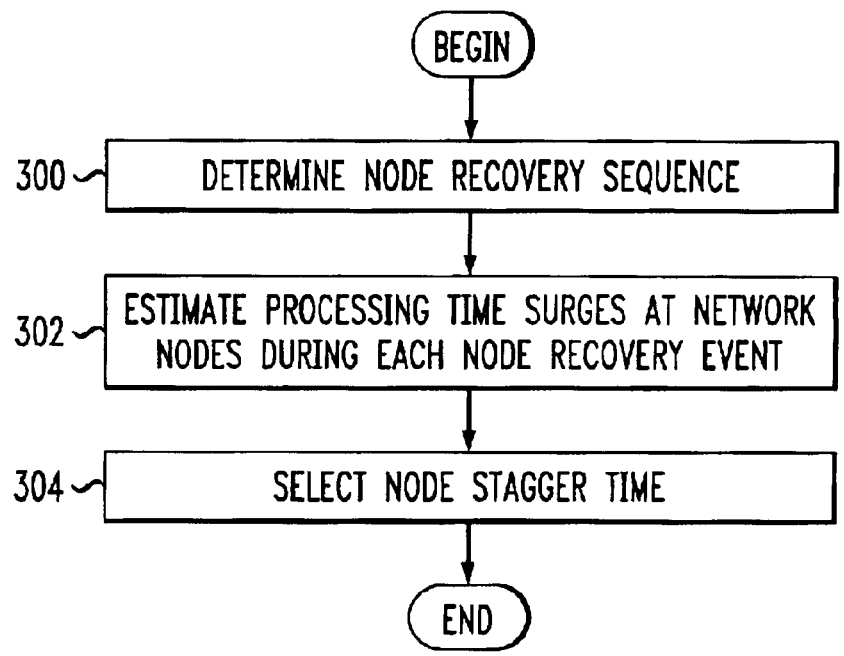
FIG. 14 is a flow diagram showing an exemplary sequence of steps for staggered node recovery in accordance with the present invention.

FIG. 14 shows an exemplary sequence of steps illustrating staggered node recovery in accordance with the present invention. It is understood that the recovery of trunks associated with each node recovery can be staggered as described above in FIG. 13. In general, network node recovery includes node recovery sequencing and time interval spacing between initiating recovery of successive nodes.

In step 300, a node recovery sequence is selected. The node sequence can be determined such that the next node to be recovered, along with all other up nodes that are networked to it, forms the largest possible subnetwork. If more than one node can be selected to form the largest subnetwork, then any of the nodes can be chosen at random, for example. It is understood that the node recovery sequence can be static or dynamic.

In step 302, the processing time surges at all network nodes associated with recovery of the nodes are estimated As each node recovers, there is a surge in processing time at the node processor due to HELLO message generation and database synchronization at each of the trunks. Furthermore, the flooding of LSA messages during the node recovery procedure causes a surge in processing time at the processors of all the nodes within the same network area as the node being recovered. Initially, the processing time surge at the node being recovered Nr is estimated. In the example described above, a network includes 200 nodes, 1000 trunks, 3000 total LSAs, 0.25 ms processing time per LSA header, 2 ms processing time per LSA during database synchronization, and 50% of the node processor available for LSA processing. In that example, the processing time surge for the first trunk recovery was 13.5 seconds, of which 1.5 seconds was due to LSA header processing and 12 seconds was for LSA processing. For each subsequent trunk recovery, the same LSA header processing is needed but typically no further LSA processing is needed since all the LSA messages were obtained during the first trunk recovery. Assuming that there are Lr trunks at the recovering node Nr, the total processing time surge at the processor of the recovering node Nr is $Pr=(12+1.5\ Lr)$ seconds. Note that the 12 seconds of LSA processing is needed only at the first trunk and the 1.5 seconds of LSA header processing is needed at all trunks. In the above calculation, processing times of HELLO messages are ignored since they are relatively small compared to database synchronization.

Next, processing time surges at other nodes are considered. As each trunk of the recovering node Nr recovers, one node-LSA and one trunk-LSA is flooded by each of the nodes on the two sides of the trunk to the rest of the network. Thus, each trunk recovery generates four LSA messages and with Lr trunks, four Lr LSA messages will be generated and flooded in the network. For another node No in the network, with trunk connectivity Lo, the node No will receive Lo copies of each LSA (over the Lo trunks) of which one will be treated as original and flooded while the rest will be treated as duplicates and discarded. Assuming on average, a processing time of 2 ms per received LSA, the total processing time at node No due to the four Lr LSA messages mentioned earlier is eight LrLo ms.

Assuming that only 50% of the CPU can be dedicated to LSA processing (the rest being dedicated to other work), the total processing time surge at the node No is $Po=16\ LrLo$ ms. As described above, the processing time surge at the recovering node Nr is $Pr=(12+1.5\ Lr)$ seconds and the processing time surge at another node No is $Po=16\ LrLo$ ms where Lr and Lo are the trunk connectivity of nodes Nr and No respectively. As an example, if $Lr=Lo=40$, then $Pr=72$ seconds and $Po=25.6$ seconds. It will be readily apparent to one of ordinary skill in the art that the above times are based on certain node processing time and topology assumptions that can be modified.

Referring again to FIG. 14, in step 304 the node stagger time is selected based on the processing time surge calculation shown above. In general, the amount of stagger time between successive node recoveries should be such that no node in the system sees an extended period of overload. As described above, extended overload periods refer to conditions of excessive message traffic that can result in loss of trunks due to delayed or lost HELLO messages and/or retransmission or retransmission lockout. However, the aggregate time to recover the nodes should also be based on the network downtime requirement.

In one embodiment, the amount of stagger between successive node recoveries is selected such that the total duration of each overload period at each node is less than or equal to a predetermined duration. An exemplary range for the total overload period duration is from about one second to about one minute.

In an alternative embodiment, the stagger time between nodes is selected such that no two processing time surges overlap. However, the stagger times should also be short enough to prevent the occurrence of a recovery time that results in an excessive network downtime.

The benefits of staggered trunk and node recovery in accordance with the present invention are readily apparent after considering the below examples.

EXAMPLE 1

Trunk Recovery

In the example considered above, it was shown that as a trunk recovers, the processing time for LSA header processing is 1–5 seconds and that for LSA processing is 12 seconds. If all trunks are recovered simultaneously, as in conventional networks, then in the worst case, each recovery will require both LSA header processing and LSA message processing resulting in a total recovery time of 13.5Lr seconds, where Lr is the total number of trunks. However, if the trunks are recovered in a staggered fashion in accordance with the present invention, then the LSA processing will be needed only for the first trunk, resulting in a total recovery time of $(12+1.5\ Lr)$ seconds. As an example, with $Lr=10$, conventional simultaneous recovery needs a total processing time of 135 seconds in contrast to staggered recovery, which needs only 27 seconds, an improvement by a factor of 5. As another example, with $Lr=40$, conventional simultaneous recovery needs a total processing time of 540 seconds whereas staggered recovery needs only 72 seconds, an improvement by a factor of 7.5. Furthermore, in conventional simultaneous recovery, the entire processing time surge comes as one big chunk. In staggered recovery, there is a first surge of 13.5 seconds as the first trunk recovers followed by many surges, each of duration 1.5 seconds, as the other trunks recover. It is preferable to have many small processing time surges compared to one large one since the node processor can perform essential processing between surges and prevent trunks/nodes from going down.

EXAMPLE 2

Node Recovery

In the earlier example, it was shown that as a node Nr with Lr trunks recovers, the total processing time surge at another node No with Lo tns is 16 LrLo ms. If ten nodes start recovering simultaneously as in conventional networks, the ten resulting processing time surges would overlap, resulting in one big processing time surge of length $$16L_o \sum_{i=1}^{10} L_{ri}$$

ms where $Lr_i$ is the trunk connectivity of the ith recovering node. However, with staggered node recovery, there will be 10 separate processing time surges with the length of the ith surge being 16 $LoLr_i$ ms.

As an example, assuming $Lo=Lr_i=40$ for all i, the conventional simultaneous node recovery will result in one processing time surge of length 256 seconds whereas the staggered node recovery will result in ten separate processing time surges, each 25.6 seconds in duration. The latter case is much preferable since there will be gaps between successive processing time surges which may be used for HELLO and LSA acknowledgement message processing and would not result in trunks being declared down when they are not or in LSA retransmission lockout.

The network can include a time-out period during the recovery of the first trunk to counter against the possibility that the neighboring node is too slow to respond. Subsequent trunk recoveries are significantly faster since they require relatively few actual LSA exchanges and thus require less staggering. A few nodes can recover simultaneously to counter against the possibility that some of the neighbors are too slow to respond.

The present invention provides a network utilizing a link-state protocol that includes a mechanism for staggering the recovery of trunks and/or nodes in a network. The recovery of the network nodes can be staggered in a predetermined sequence—for example, at selected time intervals—to reduce the duration of overload conditions at the nodes. Staggering the processing time bursts at the network nodes prevents the nodes from experiencing an extended overload period due to database synchronization or flooding of LSAs.

This arrangement prevents the loss of trunks due to excessively delayed or lost HELLO messages, avoids retransmission lockout due to excessively delayed or lost LSA acknowledgments, and avoids the resetting of nodes due to some critical task not being done for an extended period of time. Thus, staggered recovery of link-state networks, e.g., OSPF (IP) and PNNI (ATM), in accordance with the present invention reduces the reliability risk when one or more network nodes go down due to some type of failure or software upgrade, for example, and needs to be recovered. Further, the staggered recovery feature allows networks to increase in size as compared with conventional OSPF and PNNI networks. The resultant scalability improvement in the network translates into lower cost due to simpler operation and provisioning.

One skilled in the art will appreciate further features and advantages of the invention based on the above-described embodiments. Accordingly, the invention is not to be limited by what has been particularly shown and described, except as indicated by the appended claims

What is claimed is:

1. A method for recovering a network, comprising:

selecting a first trunk for recovery, the first trunk being associated with a first node;

allowing the first trunk to recover;

selecting further trunks for recovery up to a predetermined number of trunks at any one time until each trunk associated with the first node is selected for recovery;

determining a sequence for recovering each of a plurality of nodes in the network;

determining message processing time surges at each of the plurality of nodes due to recovery of the nodes; and limiting, for at least one of the plurality of nodes, an overload period due to the message processing time surges for staggering successive node recoveries.

2. The method according to claim 1, further including selecting the first trunk so as to form the largest possible subnetwork.

3. The method according to claim 1, further including randomly selecting the first trunk from a plurality of trunks associated with the first node that would form the largest possible subnetwork.

4. The method according to claim 1, further including selecting further trunks so as to form the largest possible subnetwork.

5. The method according to claim 1, further including selecting a second node for recovery.

6. The method according to claim 5, further including selecting a first trunk associated with the second node for recovery;

allowing the first trunk of the second node to recover;

selecting further trunks associated with the second node for recovery up to a second predetermined number of trunks at a given time until each trunk associated with the second node is selected for recovery.

7. The method according to claim 1, where the predetermined overload duration ranges from about one second to about sixty seconds.

8. A method for recovering a network comprising:

selecting a first trunk for recovery, the first trunk being associated with a first node;

allowing the first trunk to recover;

selecting further trunks for recovery up to a predetermined number of trunks at any one time until each trunk associated with the first node is selected for recovery;

determining sequence for recovering each of the plurality of nodes in the network;

determining message processing time surges at each of the plurality of nodes due to recovery of the nodes; and preventing the message processing time surges from overlapping.

9. A method for recovering a network, comprising:

determining a sequence for recovering nodes in the network;

determining a respective time interval between initiating recovery of the network node;

determining message processing time surges at each of the nodes in the network; and limiting for at least some of the plurality of nodes, overload periods due to message processing time surges at the nodes for staggering successive node recoveries.

10. The method according to claim 9, further including selecting a first trunk associated with a first node in the node recovery sequence.

11. The method according to claim 10, further including selecting up to N trunks associated with the first node for simultaneous recovery after the first trunk has recovered.

12. The method according to claim 11, wherein the N trunks are selected so as to form a subnetwork that is as large as possible.

13. A method for recovering a network, comprising:

determining a sequence for recovering each node in the network; and determining a respective time interval between initiating recovery of the network nodes;

determining message processing time surges at each node in the network; and preventing overlapping overload periods due to processing time surges at the nodes.

14. A method for recovering a network, comprising:

determining a sequence for recovering each node in the network; determining a respective time interval between initiating recovery of the network nodes;

selecting a first trunk associated with a first node in the node recovery sequence; and selecting un to N trunks associated with the first node for simultaneous recovery after the first trunk has recovered, wherein N ranges from two to four.

* * * * *